(12) United States Patent
Orlowsky et al.

(10) Patent No.: US 8,544,937 B2
(45) Date of Patent: Oct. 1, 2013

(54) GRAB HANDLE ASSEMBLY FOR A VEHICLE HAVING TELESCOPINGLY COLLAPSIBLE SUPPORTS

(75) Inventors: Michael Gerard Orlowsky, Sterling Heights, MI (US); Paul Schryer, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 13/168,305

(22) Filed: Jun. 24, 2011

(65) Prior Publication Data
US 2012/0326461 A1 Dec. 27, 2012

(51) Int. Cl.
*B60J 5/00* (2006.01)
(52) U.S. Cl.
USPC ............... 296/187.05; 296/1.08; 296/1.02
(58) Field of Classification Search
USPC ....... 296/187.05, 146.7, 1.08, 1.02; 188/371, 188/376, 377
See application file for complete search history.

(56) References Cited

U.S. PATENT DOCUMENTS

| 6,409,249 | B1 | 6/2002 | Han |
| 6,679,544 | B1* | 1/2004 | Hubbert et al. .......... 296/187.05 |
| 7,222,910 | B1* | 5/2007 | Doan et al. .................... 296/153 |
| 7,669,915 | B2 | 3/2010 | Lipski |
| 2011/0304172 | A1* | 12/2011 | Cho ........................... 296/146.7 |

FOREIGN PATENT DOCUMENTS
EP 0795430 B1 9/2002

* cited by examiner

*Primary Examiner* — Jason S Morrow
(74) *Attorney, Agent, or Firm* — Shook Hardy & Bacon LLP

(57) ABSTRACT

A telescopingly collapsible grab handle support assembly incorporated into a collapsible door trim pull handle for a vehicle is disclosed. The telescopingly collapsible grab handle support assembly includes a grab handle support and a grab handle support base. A portion of one of the grab handle support or the grab handle support base is fitted within the other of the grab handle support base or the grab handle support. A door grab handle is attached to the grab handle support. The grab handle support base is either attached to the door panel or is integrally formed with the door panel. A break-away structure is provided between the grab handle support and the grab handle support base. Upon impact, the break-away structure is broken and the grab handle support and the grab handle support base telescope with respect to each other thereby minimizing loads upon a vehicle occupant.

16 Claims, 3 Drawing Sheets

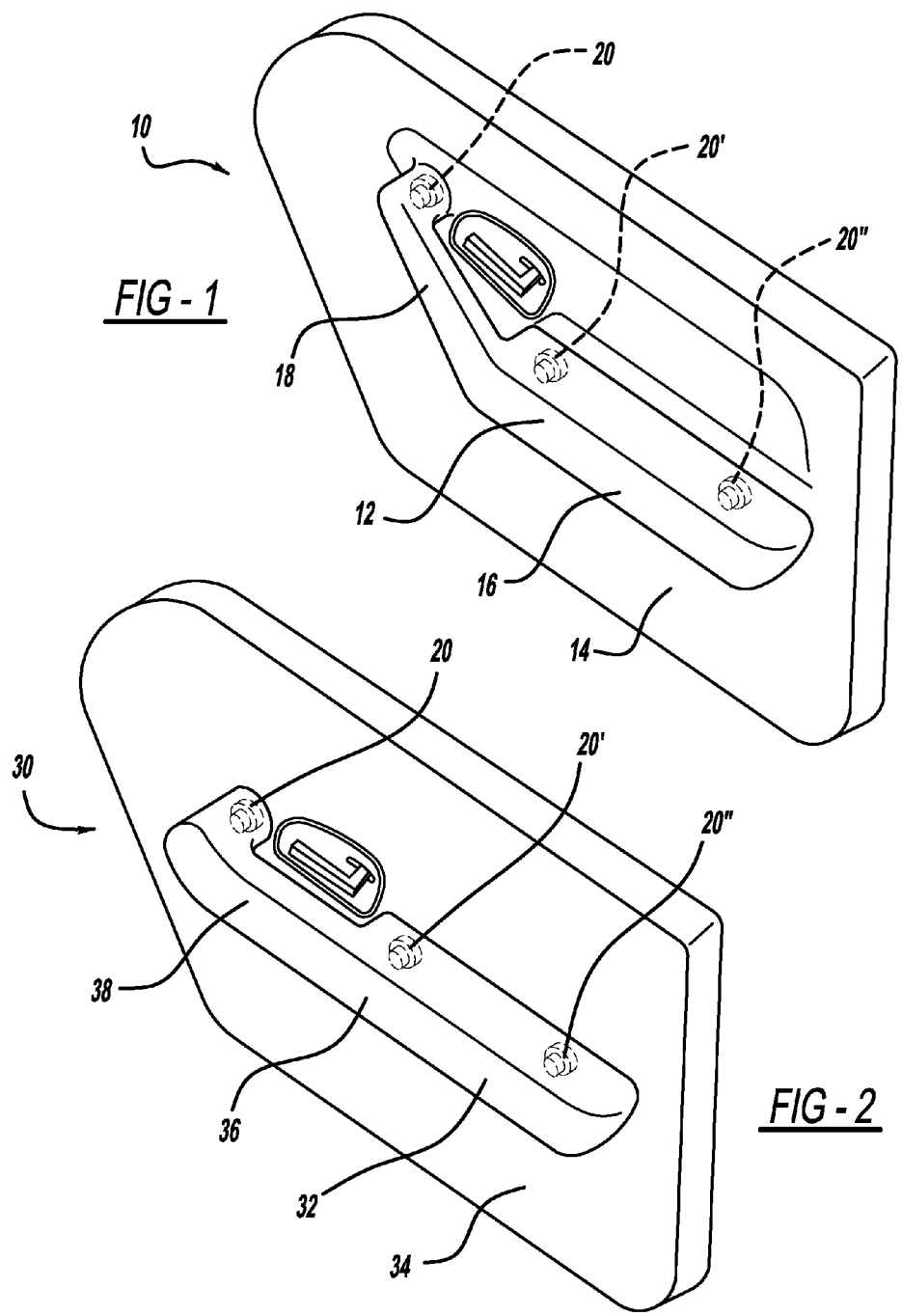

000

GRAB HANDLE ASSEMBLY FOR A VEHICLE HAVING TELESCOPINGLY COLLAPSIBLE SUPPORTS

TECHNICAL FIELD

The present invention relates generally to a door trim grab handle assembly for use with a vehicle. More specifically, the present invention relates to a door grab handle support assembly having a grab handle and one or more telescopingly collapsible supports. Each support includes a grab handle portion and a substrate portion. Part of the grab handle portion or the substrate portion is fitted within the other of the substrate portion or the grab handle portion such that upon impact the grab handle portion and the substrate portion telescope with respect to each other.

BACKGROUND OF THE INVENTION

It is known in vehicles to provide an armrest in a door having an integrated pull handle (also known as a grab handle) to allow the occupant to pull the door shut. The grab handle or pull handle is part of the vehicle's door interior trim and usually protrudes inboard in vehicles from the normal door panel surface.

Known pull handles are typically of one-piece design to meet requirements of strength and durability. Door pull handles are designed to meet specific deflection (flexing) requirements during a side impact event to minimize loads on the vehicle occupant. Particularly, when a motor vehicle is involved in a side impact event involving another vehicle or a side impact collision with a stationary object, the vehicle occupant may be compressed against the vehicle door interior trim and its components, including the grab handle. If the grab handle is situated near the location of the seated occupant or where the occupant contacts the door panel assembly, then compressive forces will be observed on the grab handle as a reaction to the forces imparted from the occupant. Equal and opposite forces will be transferred into the occupant from the grab handle and these forces may cause injury to the occupant if they are excessive.

Efforts have been made to overcome the problems of known grab handle designs. A common solution to reducing loads on the occupant from the pull handle is to remove structure. This is achieved by forming notches or grooves (designed to weaken the part) into the pull handle to initiate flex and fracture. However, this approach weakens the grab handle and adversely affects durability. In addition, the flexing or fracturing itself is difficult to predict and as a result often these features do not behave as predicted, resulting in additional changes late in the program development cycle.

A less complex and more predictable solution to the problems of known grab handle designs is to simply move the grab handle away from the occupant. While improving deflection this approach negatively affects ergonomics since the grab handle must be placed too far forward for the comfort of the occupant. In addition, this arrangement may reduce or eliminate package space for window and door controllers.

Accordingly, as in so many areas of vehicle design, there is room for improvement in the art of grab handle construction.

SUMMARY OF THE INVENTION

The disclosed invention provides an alternative arrangement to known vehicle grab pull handle designs by providing a load limiting vehicle door trim grab handle assembly for use with a vehicle comprising a grab handle and at least one and usually two telescopingly collapsible supports with one of the supports being provided at each end of the grab handle. Each support includes a grab handle portion and a substrate portion. The substrate portion may be integral with the door panel substrate or may be a separate grab handle substrate portion to allow the handle assembly to be attached to a door panel assembly as a component sub-assembly.

Each of the grab handle portion and the substrate portion includes an end flange. One of the portions includes one or more break away ribs adjacent to but spaced apart from the flange. According to one method of construction, the grab handle portion and the substrate portion are molded as separate components and are assembled by inserting one portion into the other such that part of the grab handle portion or the substrate portion is fitted within the other of the substrate portion or the grab handle portion. When attached to one another the flange of one of the portions is captured between the flange and ribs of the other portion. Alternatively, one component may be insert molded around the other during manufacture.

If the substrate portion is integral with the door panel substrate, the assembled telescopingly collapsible supports are inserted into a substrate mold and the substrate material is injected into the tool. The substrate material flows around the telescopingly collapsible supports, and the supports are trapped with in the substrate material when substrate molding is completed.

An overlapping of the flanges of the grab handle portion and the substrate portion provide a means of transferring handle pull loads (as occur when the handle is pulled to close the door) from the supports into the substrate. The breakaway ribs are designed to support compressive loads in the supports caused by push loads on the handle and to position the handle in its location. Transverse loads on the grab handle are supported by a combination of the ribs and component flanges.

In the event of a vehicle side impact, the occupant and the door grab handle assembly may make contact that may create compressive forces in the grab handle and equal and opposite forces on the occupant. The ribs are designed to break-away at a predetermined load allowing one portion to telescope relative to the other. This allows the design to limit the loads transferred to the occupant.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 illustrates a perspective view of a door assembly having one embodiment of the grab handle assembly of the disclosed invention attached thereto;

FIG. 2 illustrates a perspective view of a door assembly having another embodiment of the grab handle assembly of the disclosed invention attached thereto;

DETAILED DESCRIPTION OF THE PREFERRED EMBODIMENT

Figure 3:
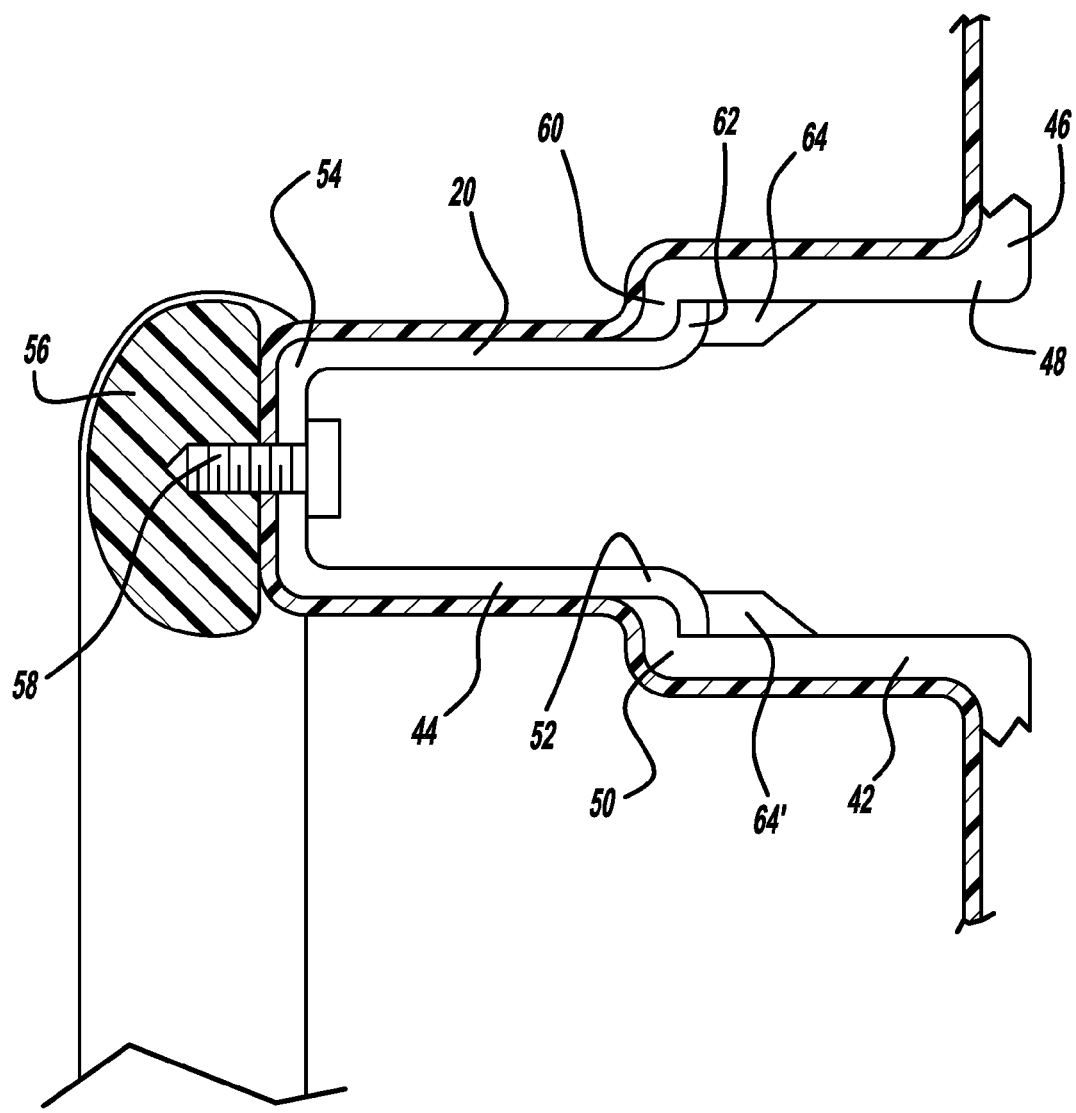
FIG. 3 illustrates a sectional view of a telescopingly collapsible support of the disclosed invention attached to a grab handle shown in partial sectional view.

In the following figures, the same reference numerals will be used to refer to the same components. In the following description, various operating parameters and components are described for different constructed embodiments. These specific parameters and components are included as examples and are not meant to be limiting.

With reference to FIG. 1, a vehicle door assembly according to one embodiment of the disclosed invention, generally illustrated as 10, is shown in perspective view. The vehicle door assembly 10 includes a grab handle assembly 12 attached to a door substrate 14. The grab handle assembly 12 includes an armrest 16 and a grab handle 18. According to this embodiment the grab handle 18 is angled relative to the long axis of the armrest 16. The overall configurations of the door substrate 14 and the grab handle assembly 12 and the illustrated angle of the grab handle 18 relative to the armrest 16 are only suggestive and are not intended as being limiting.

With reference to FIG. 2, a vehicle door assembly according to another embodiment of the disclosed invention, generally illustrated as 30, is shown in perspective view. The vehicle door assembly 30 includes a grab handle assembly 32 attached to a door substrate 34. The grab handle assembly 32 includes an armrest 36 and a grab handle 38. According to this embodiment the grab handle 38 is in alignment with the long axis of the armrest 36. The overall configurations of the door substrate 34 and the grab handle assembly 32 are only suggestive and are not intended as being limiting.

Each of the grab handle assembly 12 and the grab handle assembly 32 is attached to its respective door substrate 14 and 34 by one or more telescopingly collapsible supports such as supports 20, 20' and 20". It is to be understood that the number and placement of the telescopingly collapsible supports is variable and is based on many factors, including, for example, the size and configuration of the grab handle assembly. Accordingly, the use of three telescopingly collapsible supports as illustrated in each of FIGS. 1 and 2 is intended as being suggestive and not limiting.

One such telescopingly collapsible support 20 is illustrated in sectional view in FIG. 3. The telescopingly collapsible support 20 is shown in a preferred configuration but the shape and size may be varied without deviating from the spirit and scope of the disclosed invention. The telescopingly collapsible support 20 includes a substrate portion 42 and a grab handle portion 44. The grab handle portion 44 includes a substrate end 48 and a grab handle portion attachment end 50. The grab handle portion 44 includes a substrate attachment end 52 and a grab handle end 54. The grab handle end 54 is attached to either the grab handle or the armrest or any other portion of the grab handle as shown in FIG. 3 where a portion of an exemplary grab handle portion 56 is shown. The grab handle end 54 is attached to the grab handle portion 56 by means of, for example, a mechanical fastener 58. Other known attachment methods may be employed.

The substrate portion 42 is shown in FIG. 3 as being integral with a vehicle door substrate 46 but it is to be understood that the substrate portion 42 may be formed independent of the vehicle door substrate and may as such be attached to a vehicle door substrate by any one of several known means of attachment, such as mechanical or chemical fastening.

Each of the substrate portion 42 and the grab handle portion 44 may be formed from a variety of materials including, for example, a polymerized material or a metal.

According to one aspect of the disclosed invention, a part of one or the other of the grab handle portion 44 or the substrate portion 42 is positioned in the other portion to allow for telescoping in the event of a vehicle impact. As shown a portion of the grab handle portion 44 rests within the substrate portion 42 but it is to be understood that this is only for illustrative purposes and it may well be that a part of the substrate portion 42 may be positioned within the grab handle portion 44.

The substrate portion 42 and the grab handle portion 44 each includes a flange for retaining one in position relative to the other. Particularly, the substrate portion 42 includes a flange 60 at its grab handle attachment end 50 and the grab handle portion 44 includes a flange 62 at its substrate attachment end 52. The flanges 60 and 62 may be any structure appropriate for holding one of portions 42 and 44 relative to the other portion 44 and 42. Preferably but not exclusively the flanges 60 and 62 are radial flanges.

To retain one flange 60 and 62 in position against the other flange 62 and 60 as illustrated in FIG. 3 break away elements 64 and 64' are formed on the inner wall of one of the portions 42 or 44. In the illustrated embodiment the break away elements 64 and 64' are formed on the inner wall of the substrate portion 42. The break away elements 64 and 64' may be of any one of several designs, the illustrated rib configurations being suggestive. Whatever the configuration, the break away element must be designed to break-away at a predetermined load.

The support portion 42 and the grab handle portion 44 are formed as two separate components. According to one suggestive but non-limiting embodiment, one of these components may be insert molded around the other such that, for example, the support portion 42 is insert molded around the grab handle portion 44. According to another suggestive but non-limiting embodiment, one of the portions is inserted into the other until the flanges stop insertion and the break away elements lock one portion against the other. Particularly, according to the illustrated example, the grab handle end 54 of the grab handle portion 44 is inserted into the substrate end 48 of the support portion 42. The grab handle portion 44 is fully inserted into the substrate portion 42 when the flange 62 of the grab handle portion 44 comes into full contact with the flange 60 of the substrate portion, full contact being confirmed when the break away elements 64 and 64' snap into position to thereby lock the flange 60 against the flange 62.

Figure 4:
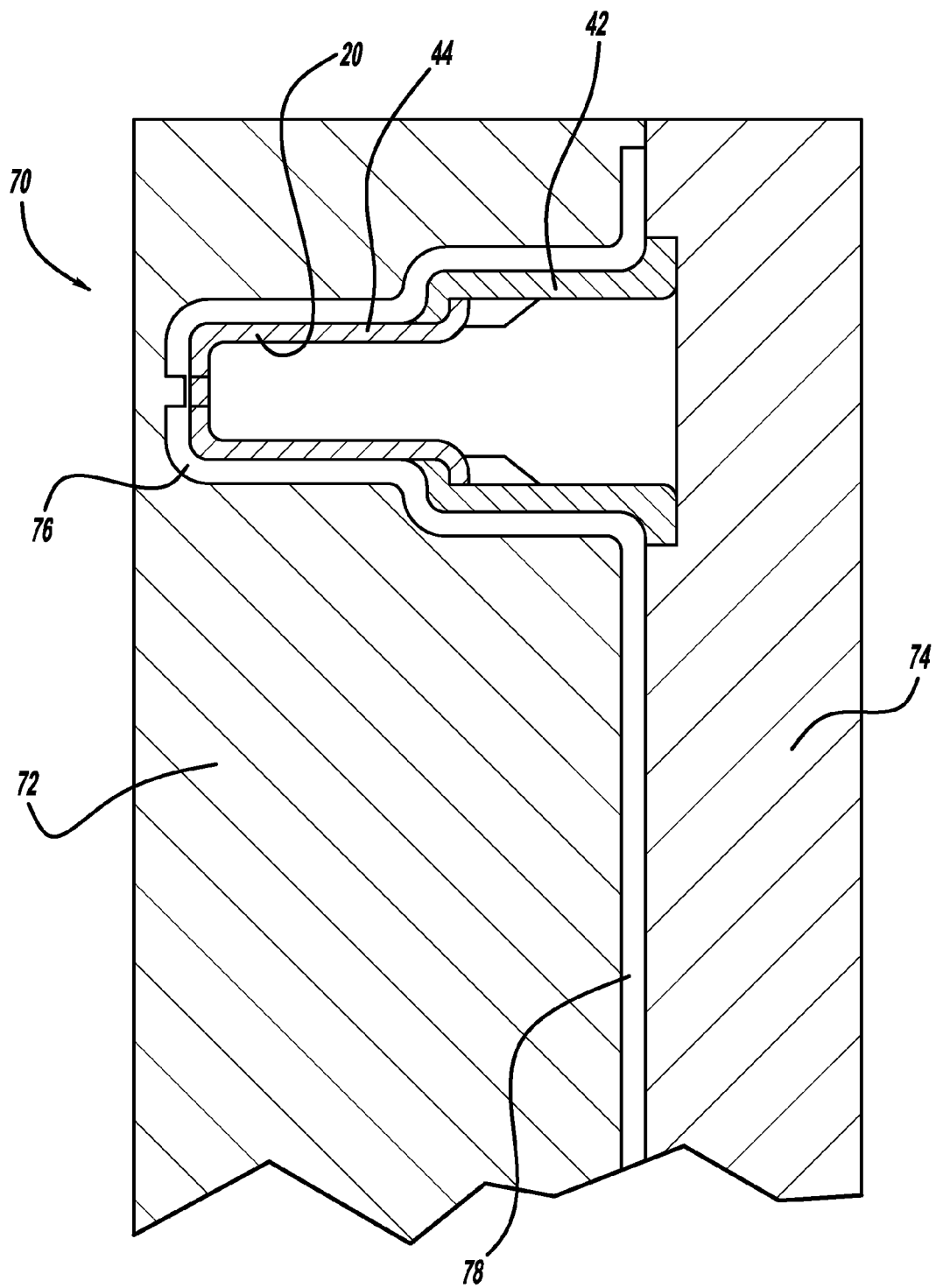
FIG. 4 is a sectional view illustrating a telescopingly collapsible support of the disclosed invention in place within a mold.

Once the telescopingly collapsible support 20 is assembled it may be used in relation to the grab handle assembly and the substrate in a number of ways. For example, the telescopingly collapsible support 20 may be attached to the grab handle assembly to form a sub-assembly which may then be attached to the vehicle door. Alternatively, the telescopingly collapsible support 20 may be integrally formed with the substrate as illustrated in FIG. 4 which shows the telescopingly collapsible support 20 in place within a substrate mold, generally illustrated as 70.

The substrate mold 70 includes a first half 72 and a second half 74. Formed within the first half 72 is a support cavity 76. Formed between the first half 72 and the second half 74 is a substrate cavity 78. According to this method of production, the assembled telescopingly collapsible support 20 is placed within the support cavity 76 of the first half 72 of the substrate mold 70. Once the telescopingly collapsible support 20 is in position within the substrate cavity 76, the first half 72 and the second half 74 of the substrate mold 70 are brought into molding position relative to one another. Thereafter the selected substrate material such as any one of several appropriate polymerizable materials is injected into the substrate mold 70 in a known manner. The substrate material flows around the telescopingly collapsible support 20 and the support 20 is trapped within the substrate material when substrate molding is completed.

As previously noted, the overlap of the flange 60 of the support portion 42 and the flange 62 of the grab handle portion 44 provide a means of transferring handle pull loads (as occur when the handle is pulled to close the door) from the telescopingly collapsible support 20 into the vehicle door substrate. The break-away elements 64 and 64' support compressive loads in the telescopingly collapsible support 20 caused by push loads on the grab handle. Transverse loads on the grab handle are supported by a combination of the break away components 64 and 64' and the flanges 60 and 62.

In the event of a vehicle side impact, the occupant and the door grab handle assembly may make contact which may create compressive forces in the grab handle and equal and opposite forces on the occupant. The break away components 64 and 64' are designed to break away at a predetermined load allowing one of the portions 42 and 44 to telescope relative to the other. This allows the design to limit the loads transferred to the occupant.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A grab handle assembly for a vehicle comprising:
   a grab handle; and
   a telescopingly collapsible support, said support including a first portion and a second portion, said portions being separately formed components and being telescopringly attached one partially within another, said first portion including a first flange and said second portion including a second flange and a break away element, said first flange being captured between said second flange and said element.

2. The grab handle assembly of claim 1 wherein said first portion is a grab handle portion attached to said grab handle and said second portion is a substrate portion, said substrate portion includes a grab handle portion attachment end and said grab handle portion includes a substrate portion attachment end.

3. The grab handle assembly of claim 2 wherein said grab handle portion attachment end is substantially hollow.

4. The grab handle assembly of claim 2 wherein one of said attachment flanges is formed on said grab handle portion attachment end and the other of said attachment flanges is formed on said substrate portion attachment end.

5. The grab handle assembly of claim 4 wherein said grab handle portion attachment end includes an inside and said attachment flange is formed on said inside and wherein said substrate portion attachment end includes an outside and said attachment flange is formed on said outside.

6. The grab handle assembly of claim 5 wherein said at least one of said attachments flanges is a radial flange.

7. A grab handle assembly for a vehicle comprising:
   a grab handle;
   a support including first portion and a second portion, said first portion including a first flange and said second portion including a second flange and a break away element, said first flange being captured between said second flange and said element; and
   one of said portions being inserted into the other of said portions to form said support.

8. The grab handle assembly of claim 7 wherein said first portion is a grab handle portion attached to said grab handle and said second portion is a substrate portion, said substrate portion includes a grab handle potion attachment end and said grab handle portion includes a substrate portion attachment end.

9. The grab handle assembly of claim 8 wherein said grab handle portion attachment end is substantially hollow.

10. The grab handle assembly of claim 8 wherein said grab handle portion attachment end includes an attachment flange.

11. The grab handle assembly of claim 10 wherein said grab handle portion attachment end includes an inside and said attachment flange is formed on said inside.

12. The grab handle assembly of claim 11 wherein said flange is a radial flange.

13. The grab handle assembly of claim 8 wherein said substrate portion attachment end includes an outside and said attachment flange is formed on said outside.

14. The grab handle assembly of claim 13 wherein said attachment flange is a radial flange.

15. The grab handle assembly of claim 8 further including a break away element formed on one or the other of said grab handle portion or said substrate portion.

16. A method of forming a grab handle assembly for a vehicle comprising:
   forming a first portion having a first flange and a second portion having a second flange and a break away element;
   inserting said first portion into said second portion until said first flange is captured between said second flange and said element to form a telescopingly collapsible support;
   forming a mold having a cavity for said support and a cavity for a substrate;
   placing said support within said support cavity; and
   injecting a polymerizable material into said cavities.

* * * * *